(12) United States Patent
Ceccarelli, III

(10) Patent No.: US 6,213,492 B1
(45) Date of Patent: Apr. 10, 2001

(54) UNDERLIFT T-BAR SUPPORT ACCESSORY

(76) Inventor: Charles Joseph Ceccarelli, III, 3195 Industrial Way, Mt. Home, ID (US) 83647

( * ) Notice: Subject to any disclaimer, the term of this patent is extended or adjusted under 35 U.S.C. 154(b) by 0 days.

(21) Appl. No.: 09/431,036

(22) Filed: Oct. 30, 1999

(51) Int. Cl.[7] .......................................................... B60D 1/14
(52) U.S. Cl. ..................................... 280/491.5; 280/416.1; 280/495; 280/901
(58) Field of Search ............................... 280/491.1, 491.5, 280/415.1, 416.1, 417.1, 418.1, 456.1, 461.1, 495, 500, 501, 901

(56) References Cited

U.S. PATENT DOCUMENTS

| | | |
|---|---|---|
| 4,824,134 | 4/1989 | Harris . |
| 4,960,288 | 10/1990 | Chambers . |
| 5,509,682 | 4/1996 | Lindenman . |
| 5,607,279 | 3/1997 | Hill . |

OTHER PUBLICATIONS

Unknown Author, Miller Industries Towing Equipment Inc. Accessory Catalog vol. II, 1998, p. 16, U.S.A.

*Primary Examiner*—Brian L. Johnson
*Assistant Examiner*—Avraham H. Lerner
(74) *Attorney, Agent, or Firm*—Charles R. Clark

(57) ABSTRACT

A removable underlift T-bar support accessory for tow trucks with underlift T-bars for lifting and towing a fifth wheel trailer or a goose neck trailer. The underlift T-bar comprises a boom connected to a crossbar having two legs. The accessory mounts on the underlift T-bar and provides a fifth wheel hitch assembly or a hitch ball at an appropriate working elevation thereby enabling the lifting and towing of a fifth wheel trailer or a goose neck trailer by a tow truck equipped with an underlift T-bar.

8 Claims, 2 Drawing Sheets

US 6,213,492 B1

UNDERLIFT T-BAR SUPPORT ACCESSORY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates to a underlift T-bar support accessory by which a tow truck operator may easily and reversibly modify an underlift T-bar of a tow truck into an underlift T-bar equipped with a convenient fifth wheel hitch assembly for lifting and towing of fifth wheel hitch trailers. The invention also optionally, but preferably, provides a hitch ball for use with gooseneck trailers that require a hitch ball on the towing vehicle.

2. Description of Related Art

A number of devices exist for mounting a fifth wheel hitch in a pickup truck bed for towing a fifth wheel hitch trailer including HARRIS, U.S. Pat. No. 4,824,134 issued Apr. 25, 1989; CHAMBERS, U.S. Pat. No. 4,960,288 issued Oct. 2, 1990; and LINDENMAN, U.S. Pat. No. 5,509,682 issued Apr. 23, 1996. These devices are not suitable for use with underlift T-bars.

At least one fifth wheel hitch apparatus distributed by Miller Industries Towing Equipment Inc. of Ooltewah, Tennessee exists that may be used with tow trucks with a rear mounted underlift T-bar. The Miller device is massive, heavy, and cumbersome and provides little elevation to its centrally disposed fifth wheel hitch above the crossbar of the underlift T-bar. The Miller device is assembled on the crossbar of the underlift T-bar by sliding a sleeve onto each of the two free ends of the crossbar, each sleeve having an ear extending to the rear of the crossbar, each ear having a receiving aperture dimensioned to receive a vertical mounting stud of a central assembly, by mounting a central assembly having two vertical mounting studs to the sleeves from above by inserting the two studs into the receiving apertures, and by securing the studs in the ears by inserting locking pins in radial-through holes in the studs below the ears. The central assembly includes a centrally disposed fifth wheel hitch for receiving a kingpin of a fifth wheel trailer. When using the Miller apparatus, the operator has to reach under the trailer to be towed to insert a keeper pin in the hitch to secure the kingpin.

HILL, U.S. Pat. No. 5,607,279 issued Mar. 4, 1997, discloses a towing lift accessory for mounting a cable sheave to the retractable leg of an underlift hoist of a winch equipped flat bed tow truck. The elements of the lift accessory and its method of use require retraction of the leg to secure the lift accessory to the leg of the underlift hoist. The lift accessory provides a means for elevating and stabilizing the sheave for use with a cable running from a winch on the tow truck to a vehicle or other load to be retrieved. Hill also provides for a hitch socket member for receiving a conventional trailer hitch accessory.

BRIEF SUMMARY OF THE INVENTION

Towing vehicles, commonly tow trucks, often have a rear mounted hydraulically actuated underlift T-bar. The underlift T-bar comprises a boom aligned with the longitudinal axis of the tow truck connected to a crossbar proximate its middle point. The crossbar has a first leg and a second leg.

Many of the currently used underlift T-bars have booms that can be telescopically extended and retracted and many of the underlift T-bars have a limited range of vertical lifting motion that is insufficient for the lifting and towing of fifth wheel trailers.

A principal objective of this invention is to provide a novel, improved, and removable fifth wheel hitch assembly support accessory that is relatively lightweight, compact, simple, and low-maintenance, that is relatively inexpensive to manufacture, and that over a long service life provides reliable performance. The present invention provides for easy and reversible modification of an underlift T-bar of a tow truck to allow the lifting and towing of a fifth wheel trailer. The invention also provides an elevated hitch ball to an underlift T-bar, accessible for easy use for lifting and towing a gooseneck trailer.

The accessory includes a novel frame easily mounted to the boom and legs of an underlift T-bar. Then either a fifth wheel hitch assembly or a hitch ball is coupled to the frame. Then either a fifth wheel trailer or a goose neck trailer is coupled to the hitch assembly or hitch ball for lifting and towing. The frame provides the hitch assembly or hitch ball at an appropriate working elevation. In the preferred embodiment, the frame provides elevation of the fifth wheel hitch assembly approximately two feet above the central axis of the crossbar of the underlift T-bar. The frame provides elevation of the hitch ball approximately one and a half feet above the central axis of the crossbar of the underlift T-bar. The elevation provided by the frame allows an underlift T-bar that has limited range of vertical lifting motion increased capability to lift and tow a fifth wheel trailer or a goose neck trailer.

The frame includes two leg-straddling brackets and one boom-straddling bracket whereby the frame is releasably mounted to the boom and the two legs of the crossbar of the underlift T-bar. The two leg-straddling brackets are spaced from each other equidistant from the middle point of the crossbar and each is dimensioned to straddle and extend downward on both sides of a leg of the crossbar and downward below the leg. The boom-straddling bracket is dimensioned to straddle and extend downward on both sides of the boom and downward below the boom. Each bracket cooperates with locking means to encircle the corresponding boom or leg. The locking means may include releasable slidably received locking pins, push-pull pins, or locking bolts that are received in a pair of cooperating apertures in each of the brackets. Preferably the locking pins are secured relative to the brackets by spring clips, hair-pin clips, lynch pin clips, or cotter pins through radial-through holes in the locking pins. If locking bolts are used, they can be secured with locking nuts.

The frame may include three bracket shims for adjusting the dimensions of the brackets relative to the boom and legs of the specific underlift T-bar being modified. The shims allow the frame when dimensioned to fit an underlift T-bar with a larger boom or larger legs to be adjusted for use with an underlift T-bar with a smaller boom or smaller legs.

Each leg-straddling bracket is joined to a vertical support, the two vertical supports are connected to opposite ends of a horizontal crosspiece. The supports and the crosspiece form a figure H. Preferably, a hitch ball is releasably mounted in an appropriate opening in the crosspiece.

The boom-straddling bracket is joined to an angled member, the angled member is joined to the crosspiece proximate its midpoint. The vertical supports at their upper ends are joined to yokes that are adapted and dimensioned to cooperate with two pintle pins of a fifth wheel hitch assembly; whereby, the hitch assembly may be operatively coupled and decoupled from the yokes. Each yoke may receive and operatively retain a pintle pin of the fifth wheel hitch assembly. Each yoke has a pair of cooperating holes for the insertion of retaining means to secure a pintle pin relative to the yoke. The retaining means may include releasable slidably received retaining pins, push-pull pins, or retaining bolts that are received in the cooperating holes. Preferably the retaining pins are secured relative to the yokes by spring clips, hair-pin clips, lynch pin clips, or cotter pins through radial-through holes in the retaining pins. If retaining bolts are used, they can be secured with locking nuts.

Another prime object of the accessory is to increase the capability of a tow truck equipped with an underlift T-bar having a telescoping boom to respond to a towing situation that involves a disabled tow vehicle towing a fifth wheel hitch trailer or a goose neck trailer. Often such a truck is also equipped with a tiltable, extendable flat bed for carrying a disabled vehicle. Nominal use of the accessory with such a truck regarding a fifth wheel hitch trailer will allow a tow truck operator to perform the following steps: loading on the bed a disabled tow vehicle even longer than the bed, extending the boom to the rear as necessary to provide clearance from the disabled tow vehicle, affixing and locking the frame to the boom and legs of the crossbar, coupling a fifth wheel hitch assembly to the frame, coupling a fifth wheel trailer to the hitch assembly, and then lifting and towing the fifth wheel trailer. Nominal use of the accessory with such a truck regarding a goose neck trailer will allow a tow truck operator to perform the following steps: loading on the bed a disabled tow vehicle even longer than the bed, extending the boom to the rear as necessary to provide clearance from the disabled tow vehicle, affixing and locking the frame to the boom and legs of the crossbar, coupling a goose neck trailer to the hitch ball, and then lifting and towing the goose neck trailer.

Another object is to provide an underlift T-bar support accessory that does not require permanent or prior structural modification of the underlift T-bar. An advantage of the present invention is that it provides a robust, underlift T-bar support accessory proximate the crossbar of the underlift T-bar. When the accessory is affixed and locked to an underlift T-bar having a telescoping boom, the accessory can be moved rearward as the boom is extended and moved forward as the boom is retracted.

Another object is to promote tow truck operator safety by providing a lightweight fifth wheel hitch assembly support accessory for use with an underlift T-bar that avoids the operator getting under the boom to attach the accessory. Use of the accessory also avoids the operator reaching under or getting under a fifth wheel trailer to secure the trailer to the fifth wheel hitch assembly.

The present invention avoids a major disadvantage of a fifth wheel hitch assembly attached to a bed of a tow truck. When a fifth wheel hitch assembly is attached to the bed of the tow truck, the bed is thereby often made unavailable for other purposes including carrying a disabled vehicle. The accessory permits convenient lifting and towing of a fifth wheel trailer without interfering with or precluding use of the bed of the tow truck.

DETAILED DESCRIPTION OF THE INVENTION

Figure 1:
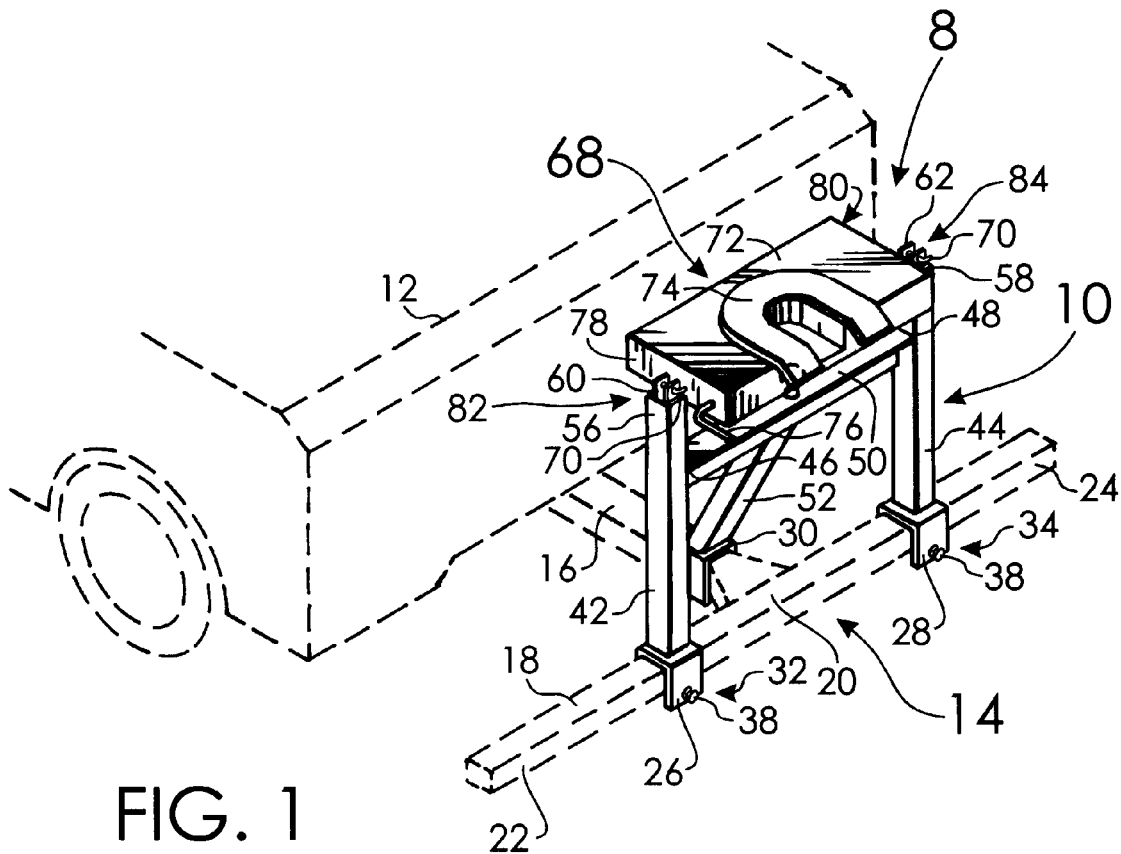
FIG. 1 is an oblique perspective view of the rear of a tow truck equipped with an underlift T-bar having attached thereto an underlift T-bar support accessory including a fifth wheel hitch assembly.

Referring to FIG. 1, the present invention is novel and provides an underlift T-bar support accessory 8 having a frame 10 especially suited for mounting on a towing vehicle preferably a tow truck 12. The tow truck 12 preferably includes an underlift T-bar 14 that extends from the back of the tow truck. The underlift T-bar 14 can be of many alternative designs known in the art. Preferably, the underlift T-bar 14 is hydraulically actuated and can be raised and lowered vertically and has a telescoping boom 16 connected to a crossbar 18 at an approximate middle point 20 of the crossbar. The telescoping boom 16 is longitudinally extendable and may be locked in variable positions of extension from fully retracted to fully extended. The crossbar 18 has a first leg 22 and a second leg 24. A method of using the accessory 8 with an underlift T-bar 14 provides for lifting and towing of a fifth wheel trailer (not shown). An alternative method of using the accessory 8 with an underlift T-bar 14 provides for lifting and towing of a goose neck trailer (not shown).

Referring to FIG. 1, the frame 10 is releasably affixed and locked to the boom 16 and the first leg 22 and the second leg 24 of the crossbar 18 of the tow truck 12. The frame 10 includes a first leg-straddling bracket 26 and a second leg-straddling bracket 28. Alternatively, the first leg-straddling bracket 26 and the second leg-straddling bracket 28 are together referred to as the leg-straddling brackets 26 and 28. The leg-straddling brackets 26 and 28 are spaced from each other equidistant from the middle point of the crossbar 18 and respectively extend downward, around, and downward below the first leg 22 and the second leg 24 of the crossbar 18. The first leg 22 of the crossbar 18 releasably receives the first leg-straddling bracket 26. Correspondingly, the second leg 24 releasably receives the second leg-straddling bracket 28.

Figure 2:
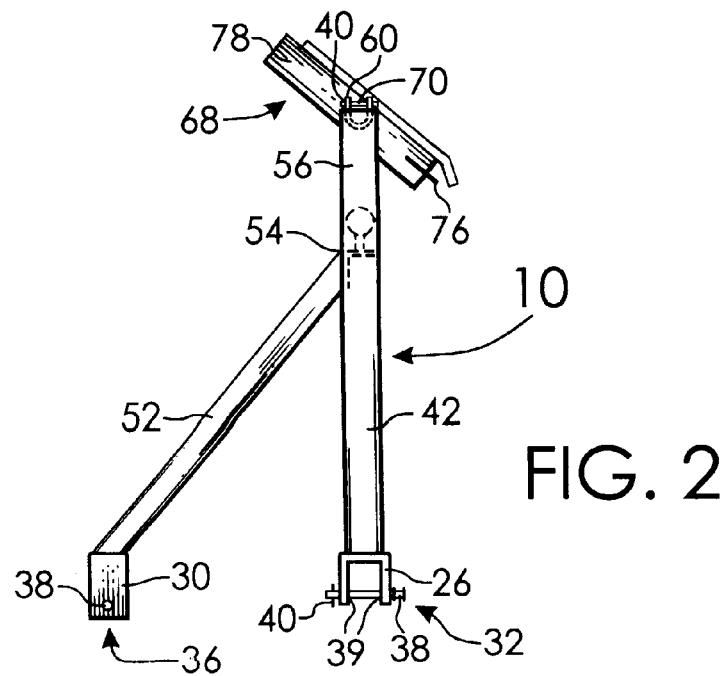
FIG. 2 is a side elevational view of the underlift T-bar support accessory shown in FIG. 1.
Figure 3:
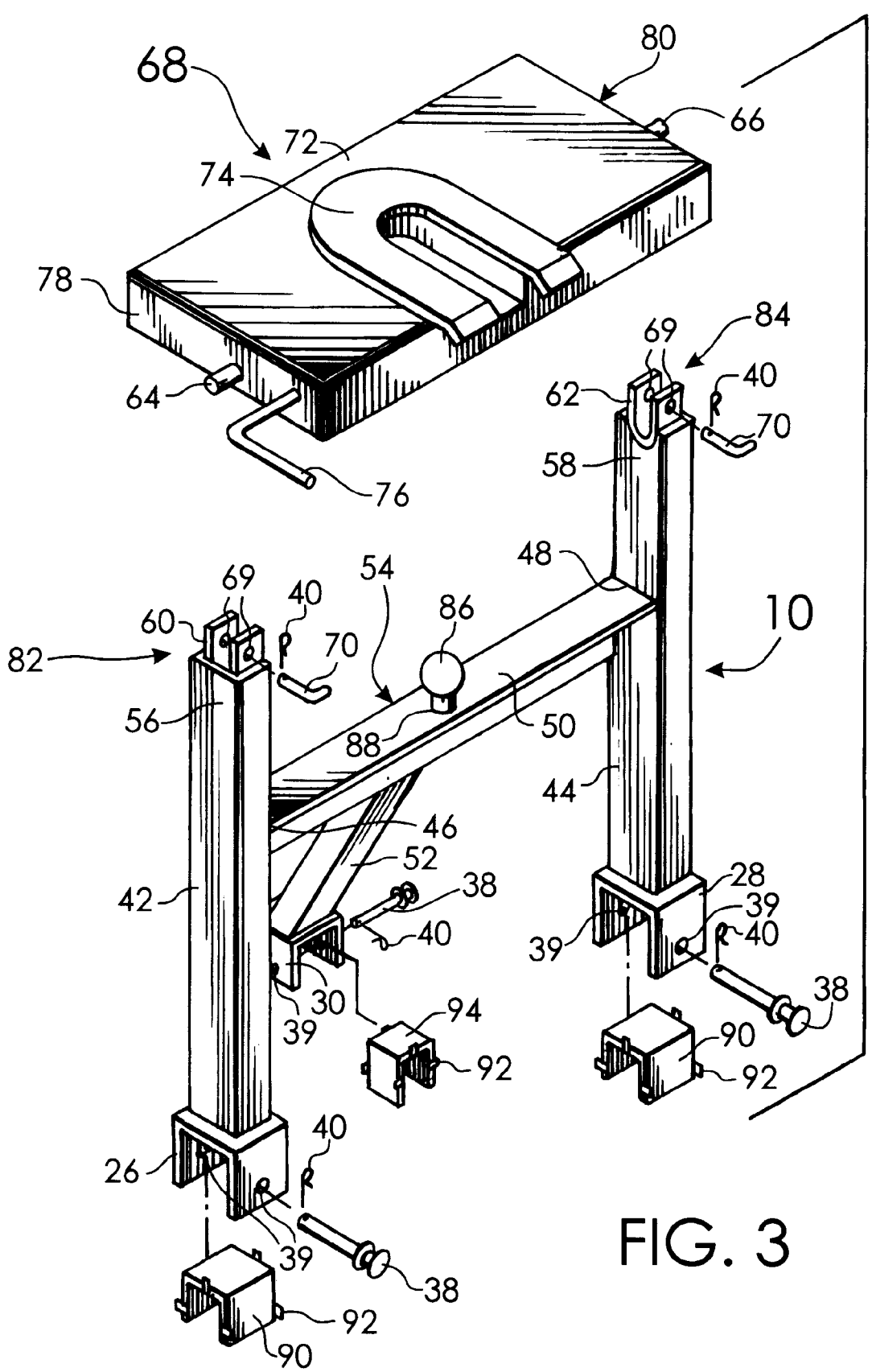
FIG. 3 is an oblique, partially exploded, perspective view of the underlift T-bar support accessory.

Referring to FIGS. 1, 2, and 3, the frame 10 further includes a boom-straddling bracket 30. The boom 16 releasably receives the boom-straddling bracket 30. The boom-straddling bracket 30 extends downward, around, and downward below the boom 16.

The leg-straddling brackets 26 and 28 and the boom-straddling bracket 30 each include a bracket locking means 32, 34, and 36 to releasably affix and lock respectively each of the leg-straddling brackets 26 and 28 to the first leg 22 and the second leg 24 of the crossbar 18 and the boom-straddling bracket 30 to the boom 16. The bracket locking means 32, 34, and 36 shown each include a locking pin 38 slidably received in a pair of cooperating apertures 39 in each of the leg-straddling brackets 26 and 28 and the boom-straddling bracket 30. Each locking pin 38 may be held in position by a spring clip 40. The leg-straddling brackets 26 and 28 and the bracket locking means 32 and 34 respectively encircle the first leg 22 and the second leg 24 of the crossbar 18. The boom-straddling bracket 30 and the bracket locking means 36 encircle the boom 16.

The frame 10 also includes a first vertical support 42 and a second vertical support 44. The first vertical support 42 is joined to the first leg-straddling bracket 26 and depends vertically from the leg-straddling bracket 26. Correspondingly, the second vertical support 44 is joined to the second leg-straddling bracket 28 and depends vertically from the leg-straddling bracket 28. Alternatively, the first vertical support 42 and the second vertical support 44 are together referred to as the vertical supports 42 and 44. The vertical supports 42 and 44 are joined respectively to opposite ends 46 and 48 of a horizontal crosspiece 50. In the preferred embodiment, the vertical supports 42 and 44 are parallel to one another and the crosspiece 50 is welded between them forming a figure H.

The frame 10 further includes an angled member 52. The angled member 52 is joined to the boom-straddling bracket 30. The angled member 52 depends upwardly and rearwardly from the boom-straddling bracket 30 and is connected to the crosspiece 50 proximate its midpoint 54.

Respectively, each vertical support 42 and 44 has an upper end 56 and 58. Each upper end 56 and 58 is joined respectively to a yoke 60 and 62. Each yoke 60 and 62 is U-shaped and is dimensioned to receive respectively a pintle pin 64 and 66 of a fifth wheel hitch assembly 68. Each yoke 60 and 62 has a pair of cooperating holes 69 for the insertion of a retaining pin 70 that may be held in position by a spring clip 40.

The accessory 8 includes a fifth wheel hitch assembly 68. Referring to FIG. 3, the hitch assembly 68 comprises a draw-bar member 72 having a centrally disposed locking hitch 74 controlled by a control handle 76 and a pair of pintle pins 64 and 66 projecting respectively from opposite sides 78 and 80 of the draw-bar member 72. Preferably the pintle pins 64 and 66 are coaxial.

The hitch assembly 68 can be pivotably and operatively connected to the yokes 60 and 62 via pintle pin retaining means 82 and 84 that retain pintle pins 64 and 66 after the pintle pins 64 and 66 are respectively received by the yokes 60 and 62. As depicted in FIGS. 1 and 3, the pintle pin retaining means 82 and 84 shown each include a retaining pin 70 that is slidably received in a pair of cooperating holes 69 formed in each yoke 60 and 62. Each retaining pin 70 may be held in position by a spring clip 40.

The hitch assembly 68, in a manner known in the art, may be releasably locked by means of the control handle 76 to secure a king pin (not shown) of a trailer to be towed (not shown).

The leg-straddling brackets 26 and 28, the boom-straddling bracket 30, the vertical supports 42 and 44, the angled member 52, the horizontal crosspiece 60, and the yokes 60 and 62 can be fabricated from structural steel. The brackets 26, 28, and 30 can be formed of appropriate sized channel or in an exemplary configuration fabricated from L-shaped pieces of steel welded together to form a channel-shaped bracket. The vertical supports 42 and 44 can be formed of two-inch by three-inch structural steel tubing each having a length of approximately 24 inches each welded respectively to a leg-straddling bracket 26 and 28. The angled member 52 can be formed of two-inch by three-inch structural steel tubing having a length of approximately 22 inches. The angled member 52 is beveled for welding and is welded to the boom-straddling bracket 30 at a preferred angle of approximately 45 degrees from the horizontal and is beveled at the other end for welding and is welded to the crosspiece 50. The yokes 60 and 62 can be formed from two-inch by ¼-inch flat steel bars each having a length of approximately five inches. The yokes 60 and 62 preferably are welded respectively to upper ends 56 and 58. The crosspiece 50 preferably can be formed from three-inch steel angle iron having rearwardly and downwardly extending flanges and having a length of approximately 18½ inches. The crosspiece 50 may alternatively be formed from solid steel bar or round, square, or rectangular steel tubing. The opposite ends 46 and 48 of the crosspiece 50 are welded respectively to vertical supports 42 and 44.

The locking pins 38 preferably are ⅝-inch pins of suitable length to extend through and beyond the pair of cooperating apertures 39 in the brackets 26, 28, and 30 to enable securing of the locking pins 38 by spring clips 40. The retaining pins 70 preferably are ⅜ inch pins of suitable length to extend through and beyond the pair of cooperating holes 69 in the yokes 60 and 62 to enable securing of the retaining pins 70 by spring clips 40. Preferably, the pins 38 and 70 are made of cold-rolled steel and the spring clips 40 are made of spring steel. Preferably, the pins 38 have a double head as shown in FIG. 3 to facilitate insertion and removal of the pin.

The fifth wheel hitch assembly 68 can be a RBW INDUSTRIES, INC., model: LR-1001 crossbar hitch (LI'L ROCK'R $5^{th}$ Wheel Hitch) with the annular terminal flanges (not shown) ground off so that the pintle pins 64 and 66 are cylindrical in shape.

The support accessory 8 can be conveniently used with various underlift T-bars available from Miller Industries Towing Equipment Inc., Jerr-Dan Underlifts, NO-Mar, Dynamic, and Kilar. Preferably, the underlift T-bar 14 includes a telescoping boom 16 that is longitudinally extendable and may be locked in variable positions of extension from fully retracted to fully extended.

The frame 10 may also include a hitch ball 86 releasably mounted in an appropriate opening 88 in the crosspiece 50. The hitch ball 86 can be a conventional hitch ball which may be of any of the various conventional, available sizes, but preferably having a 1-inch threaded shank.

Referring to FIG. 3, the frame 10 may include two leg-bracket shims 90 having a plurality of alignment tabs 92 and one boom-bracket shim 94 having a plurality of alignment tabs 92 for adjusting the dimensions of the brackets 26, 28, and 30 relative respectively to the first leg 22 and the second leg 24 of the crossbar 18 and to the boom 16 of the specific underlift T-bar 14 being modified. The shims 90 and 94 are slidably received within brackets 26, 28, and 30 and allow the frame 10 when dimensioned to fit an underlift T-bar 14 with a larger boom 16 or larger crossbar 18 to be adjusted for use with an underlift T-bar with a smaller boom or smaller crossbar. The shims 90 and 94 can be fabricated from structural steel and can be formed of appropriate sized channel or in an exemplary configuration fabricated from L-shaped pieces of steel welded together to form a channel-shaped shim.

From the preceding, it should be apparent that the present invention provides a new underlift T-bar support accessory and methods that allow for convenient, easy modification of an underlift T-bar of a tow truck to permit the lifting and towing of fifth wheel trailers or goose neck trailers.

The preceding description and exposition of a preferred embodiment of the invention is presented for purposes of illustration and enabling disclosure. It is neither intended to be exhaustive nor to limit the invention to the precise form disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

I claim:

1. An underlift T-bar support accessory in combination with a tow truck having a rear mounted underlift T-bar, said T-bar having a boom and a crossbar, said boom connected to said crossbar proximate a middle point of said crossbar, said crossbar having a first leg and a second leg, wherein the accessory comprises:

a frame having two leg-straddling brackets and a boom-straddling bracket, each said leg-straddling bracket and said boom-straddling bracket is provided with a bracket locking means for releasably affixing and locking respectively said leg-straddling brackets to said legs and said boom-straddling bracket to said boom; and, said frame further comprising two vertical supports each joined respectively to one of said leg-straddling brackets, a crosspiece joined at each of its opposite ends to one of said vertical supports, an angled member joined to said boom-straddling bracket, said angled member joined to said crosspiece;

whereby said frame is releasably affixed and locked to said underlift T-bar.

2. An accessory according to claim 1 further comprising two yokes; said vertical supports each having an upper end; each said upper end joined respectively to one of said yokes; each said yoke having a pintle pin retaining means for receiving and operatively retaining a pintle pin;

a fifth wheel hitch assembly comprising a draw-bar member having a pair of pintle pins projecting from opposite sides of said draw-bar member, said yokes receiving and operatively retaining said pintle pins;

whereby said hitch assembly may receive and retain a fifth wheel trailer for lifting and towing.

3. An accessory according to claim I further comprising a hitch ball, said crosspiece having an opening, said hitch ball releasably mounted in said opening; whereby said hitch ball may be coupled to a goose neck trailer for lifting and towing.

4. An accessory according to claim 2 wherein said leg-straddling brackets and said boom-straddling bracket each having a pair of cooperating apertures; said bracket locking means each include a locking pin received in said cooperating apertures and a spring clip securing said locking pin relative to the bracket.

5. An accessory according to claim 4 wherein each said yoke having a pair of cooperating holes; said pintle retaining means each include a retaining pin received in said cooperating holes and a spring clip securing said retaining pin relative to said yoke.

6. An accessory according to claim 3 wherein said leg-straddling brackets and said boom-straddling bracket each having a pair of cooperating apertures; said bracket locking means each include a locking pin received in said cooperating apertures and a spring clip securing said locking pin relative to the bracket.

7. An underlift T-bar support accessory in combination with a tow truck having a rear mounted underlift T-bar, said T-bar having a boom and a crossbar, said boom connected to said crossbar proximate a middle point of said crossbar, said crossbar having a first leg and a second leg, wherein the accessory comprises:

a frame, said frame having two leg-straddling brackets, and a boom-straddling bracket, said leg-straddling brackets spaced from one another equidistant from the middle point of said crossbar, said leg-straddling brackets respectively extend downward, around, and downward below said first leg and said second leg, said boom-straddling bracket extends downward, around, and downward below said boom, said leg-straddling brackets and said boom-straddling bracket each having a bracket locking means to releasably affix and lock respectively each of said leg-straddling brackets to said first leg and said second leg and said boom-straddling bracket to said boom, a first vertical support is joined to said first leg-straddling bracket, a second vertical support is joined to said second leg-straddling bracket, said vertical supports are joined respectively to opposite ends of a horizontal crosspiece, an angled member is joined to said boom-straddling bracket, said angled member is connected to said crosspiece, each said vertical support having an upper end, each said upper end joined to a yoke, a fifth wheel hitch assembly having a pair of pintle pins, and said hitch assembly operatively connected to said yokes via pintle pin retaining means after said pintle pins are received by said yokes.

8. A method for lifting and towing a fifth wheel trailer by an existing tow truck having a rear mounted underlift T-bar, said T-bar having a boom and a crossbar, said boom connected to said crossbar proximate a middle point of said crossbar, said crossbar having a first leg and a second leg comprising:

(a) providing an underlift T-bar support accessory having a frame, said frame having two leg-straddling brackets, and a boom-straddling bracket, said leg-straddling brackets spaced from one another equidistant from the middle point of said crossbar, said leg-straddling brackets respectively extend downward, around, and downward below said first leg and said second leg, said boom-straddling bracket extends downward, around, and downward below said boom, said leg-straddling brackets and said boom-straddling bracket each having a bracket locking means to releasably affix and lock respectively each of said leg-straddling brackets to said first leg and said second leg and said boom-straddling bracket to said boom, a first vertical support is joined to said first leg-straddling bracket, a second vertical support is joined to said second leg-straddling bracket, said vertical supports are joined respectively to opposite ends of a horizontal crosspiece, an angled member is joined to said boom-straddling bracket, said angled member is connected to said crosspiece, each said vertical support having an upper end, each said upper end joined to a yoke, a fifth wheel hitch assembly having a pair of pintle pins, and said hitch assembly operatively connected to said yokes via pintle pin retaining means after said pintle pins are received by said yokes;

(b) affixing and locking said frame to said boom and said first leg and said second leg;

(c) coupling a fifth wheel trailer to said hitch assembly; and (d) lifting and towing the fifth wheel trailer.

* * * * *